United States Patent
Sueoka et al.

(10) Patent No.: US 11,380,360 B2
(45) Date of Patent: Jul. 5, 2022

(54) STORAGE APPARATUS

(71) Applicant: SHOWA DENKO K.K., Tokyo (JP)

(72) Inventors: Yoshihito Sueoka, Chiba (JP); Masato Fukushima, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 17/108,275

(22) Filed: Dec. 1, 2020

(65) Prior Publication Data
US 2021/0201951 A1  Jul. 1, 2021

(30) Foreign Application Priority Data
Dec. 27, 2019  (JP) .............. JP2019-238799

(51) Int. Cl.
| G11B 33/08 | (2006.01) |
| G11B 21/08 | (2006.01) |
| G11B 19/20 | (2006.01) |
| G11B 5/012 | (2006.01) |

(52) U.S. Cl.
CPC .............. *G11B 21/08* (2013.01); *G11B 5/012* (2013.01); *G11B 19/2018* (2013.01)

(58) Field of Classification Search
CPC ........... G11B 33/08; G11B 21/22; G11B 5/54; G11B 21/12; G11B 5/484; G11B 5/4833
USPC ............................ 360/75, 97.12, 97.19, 97.2
See application file for complete search history.

(56) References Cited

U.S. PATENT DOCUMENTS

| 7,570,453 | B2* | 8/2009 | Kim ................ H04W 72/0466 360/99.18 |
| 8,339,732 | B2 | 12/2012 | Juang et al. |
| 8,797,677 | B2* | 8/2014 | Heo ..................... G11B 25/043 360/97.2 |
| 10,373,651 | B2* | 8/2019 | Sato ..................... G11B 33/025 |
| 2001/0012174 | A1 | 8/2001 | Imamura |
| 2008/0086739 | A1 | 4/2008 | Naruse |

FOREIGN PATENT DOCUMENTS

| CN | 101159153 | 4/2008 |
| JP | 2000-113627 | 4/2000 |
| JP | 2000-222838 | 8/2000 |
| JP | 2000-268531 | 9/2000 |
| JP | 2001-101814 | 4/2001 |
| JP | 2012-138139 | 7/2012 |

* cited by examiner

*Primary Examiner* — Nabil Z Hindi
(74) *Attorney, Agent, or Firm* — IPUSA, PLLC

(57) ABSTRACT

A storage apparatus includes a disk-shaped recording medium, a motor configured to drive and rotate the recording medium, a head configured to read information from and write information to the recording medium, and a support member configured to support the recording medium when the recording bends in response to external vibration or shock. The support member supports the recording medium by making contact with the recording medium only when the external vibration or shock is applied to the storage apparatus.

14 Claims, 3 Drawing Sheets

STORAGE APPARATUS

CROSS-REFERENCE TO RELATED APPLICATIONS

This application is based upon and claims priority to Japanese Patent Application No. 2019-238799 filed on Dec. 27, 2019, the entire contents of which are incorporated herein by reference.

BACKGROUND OF THE INVENTION

1. Field of the Invention

The present invention relates to a storage apparatus. The storage apparatus is sometimes also referred to as a recording and reproducing apparatus.

2. Description of the Related Art

Recently, storage apparatuses, such as Hard Disk Drives (HDDs), are popularly used as external storage devices for computers. In recent years, such storage apparatuses are implemented in various mobile or portable products, including lap-top computers, pad devices, smartphones, or the like. For this reason, the storage apparatuses are also used in environments in which the storage apparatuses may be subject to external vibration and shock.

As a countermeasure against the vibration and shock applied to the HDD, a load and unload mechanism (or a ramp load mechanism) may be provided to move a head on a disk surface of a disk-shaped recording medium to a receded (or parked) position while the HDD is stopped.

According to such a ramp load mechanism, the head is unloaded to a ramp arranged outside a range of the disk-shaped recording medium in a plan view when the HDD is stopped, and the head is loaded from the ramp onto the disk-shaped recording medium when the HDD is started. The ramp is a sloped component, and the head positioned on the disk surface rides on this ramp when moving to the receded position, as described in Japanese Laid-Open Patent Publication No. 2000-222838, for example.

In addition, a casing having a recessed inner surface to avoid contact between the disk-shaped recording medium and the casing when the external shock is applied to the HDD, is proposed in U.S. Pat. No. 8,339,732, for example.

Further, Japanese Laid-Open Patent Publication No. 2012-138139, for example, proposes providing a flow straightening plate for straightening an air flow between the disk-shaped recording media of the HDD.

However, the recent developments of networks including the Internet and the expansion of the use of big data, require the storage capacity per unit volume of the HDD to increase. For this reason, in order to increase the storage capacity per standardized HDD, there are attempts to increase the number of disk-shaped recording media accommodated within the casing of the HDD.

For example, the thickness of a substrate of a conventional 3.5-inch disk-shaped recording medium is 1.27 mm, and in this case, a maximum of five disk-shaped recording media can be accommodated within the casing of the 3.5-inch standardized HDD. On the other hand, in recent high-capacity 3.5-inch standardized HDDs, more than five disk-shaped recording media are accommodated within the casing by reducing the thickness of the substrate.

The reduced thickness of the substrate of the disk-shaped recording medium deteriorates the rigidity of the substrate of the disk-shaped recording medium, and consequently, the disk-shaped recording medium may easily bend when a strong external vibration or shock is applied to the HDD. As a result, there is an increased risk of the disk-shaped recording medium inside the casing of the HDD making contact with other parts of the HDD, particularly when the strong external vibration or shock is applied to the HDD.

SUMMARY OF THE INVENTION

One object of the embodiments of the present invention is to provide a storage apparatus having a high resistance with respect to strong external vibration or shock that may be applied thereto.

A more specific object of the embodiments of the present invention is to provide a storage apparatus including a disk-shaped recording medium; a motor configured to drive and rotate the recording medium; a head configured to read information from and write information to the recording medium; and a support member configured to support the recording medium when the recording bends in response to external vibration or shock, wherein the support member supports the recording medium by making contact with the recording medium only when the external vibration or shock is applied to the storage apparatus.

The support member may be configured to make contact with a side portion or a side surface of the recording medium.

The support member may be provided at three or more locations inside the storage apparatus.

The support member may be provided at equally spaced locations with respect to the recording medium.

The storage apparatus may further include a ramp mechanism configured to move the head from a position above the recording medium to a head receded position not overlapping the recording medium in a plan view of the storage apparatus, and the ramp mechanism may have a structure that enables the ramp mechanism to also function as the support member.

The storage apparatus may further include a flow straightening plate configured to straighten an air flow generated due to rotation of the recording medium, and the flow straightening plate may have a structure that enables the flow straightening plate to also function as the support member.

One of the support member, the ramp mechanism, and the flow straightening plate may function as at least one of the remaining two of the support member, the ramp mechanism, and the flow straightening plate.

Other objects and further features of the present invention will be apparent from the following detailed description when read in conjunction with the accompanying drawings.

DESCRIPTION OF THE PREFERRED EMBODIMENTS

Figure 1:
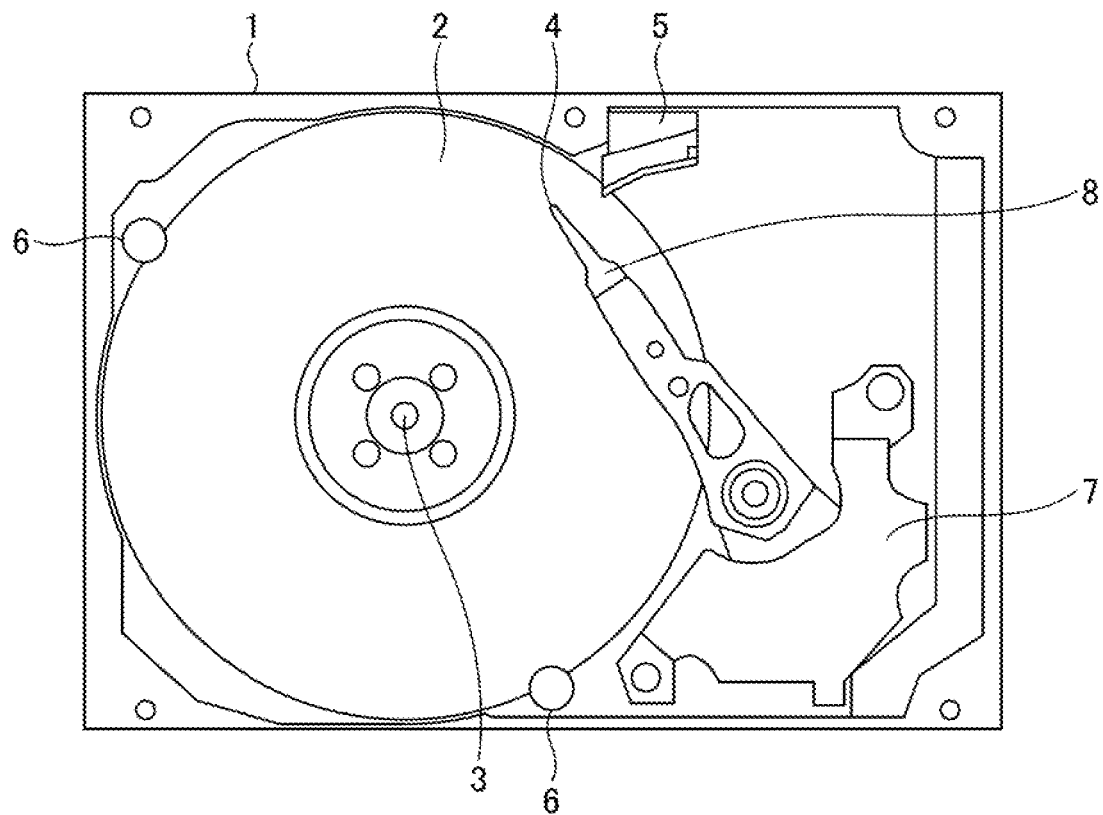
FIG. 1 is a schematic plan view for explaining a storage apparatus according to a first embodiment of the present invention.

Embodiments of the present invention will be described with reference to the drawings. The same constituent elements are designated by the same reference numerals, and a repeated description of the same constituent elements will be omitted.

The present disclosure relates to a storage apparatus including a support member that supports a recording medium (or platter) that bends in response to external vibration or shock. FIG. 1 is a schematic plan view for explaining the storage apparatus according to a first embodiment of the present invention.

In FIG. 1, a storage apparatus (recording and reproducing apparatus, or write and read apparatus) 1 according to this embodiment includes a disk-shaped recording medium (hereinafter also simply referred to as a "recording medium") 2, a motor 3 configured to drive and rotate the recording medium 2, a head 4 configured to read information from and write information to the recording medium 2, a support member 6. The support member 6 is configured support the recording medium 2 that bends in response to the external vibration or shock. The support member 6 makes contact with and supports the bent recording medium 2 only when the external vibration or shock is applied to the storage apparatus 1.

The storage apparatus 1 according to this embodiment employs the above described structure to reduce the bending of the recording medium 2, even when strong external vibration or shock is applied to the storage apparatus 1. As a result, vibration resistance and shock resistance of the storage apparatus 1 can be improved.

In FIG. 1, the head 4 is mounted on a suspension arm 8, and is driven by a voice coil motor 7 to move in a direction parallel to a recording surface of the recording medium 2. When stopping the storage apparatus 1, the head 4 is moved from a position above the recording medium 2 to a head receded position, using a ramp mechanism 5. The head 4 located at the head receded position does not overlap the recording surface of the recording medium 2 in a plan view of the storage apparatus 1.

Figure 2:
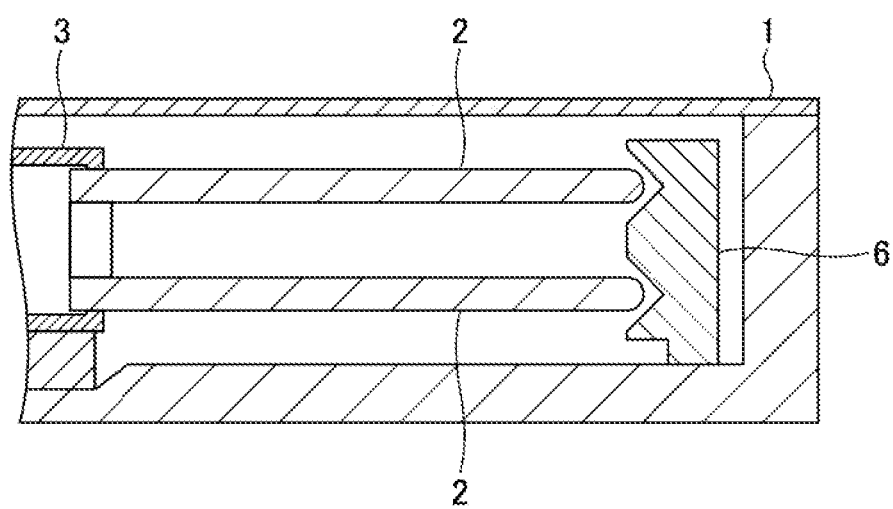
FIG. 2 is a schematic cross sectional view for explaining the storage apparatus according to the first embodiment of the present invention.

FIG. 2 is a schematic cross sectional view for explaining the storage apparatus according to the first embodiment of the present invention, and schematically illustrates a cross sectional shape of the support member 6. The support member 6 is provided at an outer peripheral portion of the disk-shaped recording media 2, and does not make contact with the recording media 2 in a normal state where no external vibration or shock is applied to the storage apparatus 1. On the other hand, in a state where a strong external vibration or shock is applied to the storage apparatus 1, and consequently, also to the recording media 2, and the recording media 2 are bent (or defamed), the support member 6 makes contact with the recording media 2 to reduce a bending amount of the recording media 2. In other words, if a strong external force is applied to the storage apparatus 1 and the recording medium 2 undergoes a plastic deformation such that the bending amount exceeds an elastic deformation zone, the head 4 vibrates up and down with respect to the recording surface of the recording medium 2. For this reason, when the vibrating amount of the head 4 becomes large, the suspension arm 8 can no longer support the up and down vibrations of the head 4, and the storage apparatus 1 cannot function properly.

In this embodiment, the support member 6 supports a predetermined portion of each recording medium 2 that is bent due to the external vibration or shock. This predetermined portion may preferably be an end portion of the recording medium 2, that is, a surface portion of the recording medium 2 where no reading of information and no writing of information take place, or a surface portion of the recording medium 2 over which the head 4 floats and moves. When the recording medium 2 and the support member 6 make contact with each other, a dent may be formed at a portion of the recording medium 2 contacted by the support member 6. However, if the dent is formed in the portion of the recording medium 2 where no reading of information and no writing of information take place, or the surface portion of the recording medium 2 over which the head 4 floats and moves, the operation of the storage apparatus 1 is unaffected by the contact between the recording medium 2 and the support member 6.

Figure 3:
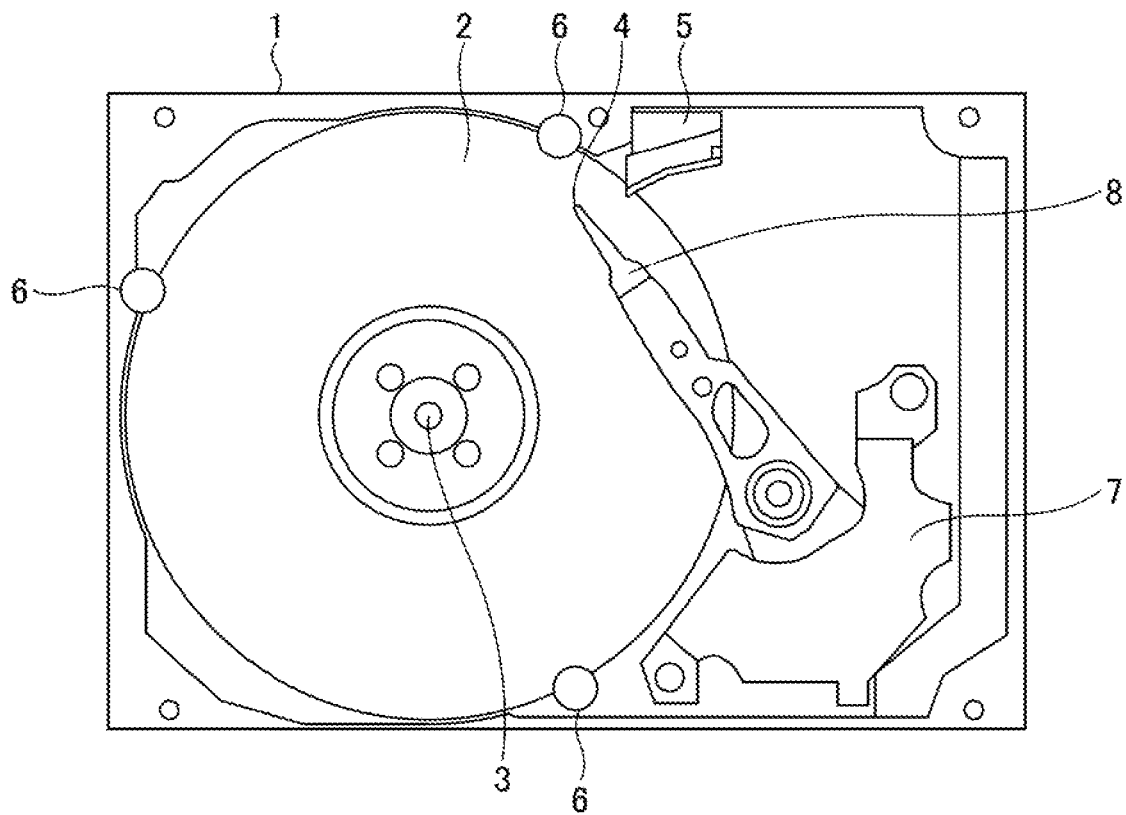
FIG. 3 is a schematic plan view for explaining the storage apparatus according to a second embodiment of the present invention.

In the storage apparatus 1, the support member 6 may preferably provided at three or more locations inside the storage apparatus 1, as illustrated in FIG. 3. FIG. 3 is a schematic plan view for explaining the storage apparatus according to a second embodiment of the present invention. In addition, the support members 6 may preferably be provided at equally spaced locations with respect to the recording medium 2. Providing three support members 6 at equally spaced locations with respect to the recording medium 2, means that a central angle of the recording medium 2 is set to 120 degrees.

When three or more support members 6 are provided, the number of portions where the recording medium 2 is supported increases. For this reason, it is possible to reduce the number of portions of the recording medium 2 where the deformation occurs, thereby further improving the vibration resistance and the shock resistance of the storage apparatus 1. In addition, by providing the support members 6 at equally spaced locations, the amount of deformation of the recording medium 2 can be made uniform at each of the portions of the recording medium 2 where the deformation occurs, thereby further improving the vibration resistance and the shock resistance of the storage apparatus 1.

In this embodiment, the head 4 is moved from the position above the recording medium 2 to the head receded position, using the ramp mechanism 5 provided in the storage apparatus 1. This ramp mechanism 5 may preferably have a structure that enables this ramp mechanism 5 to also function as the support member 6. By employing such a structure for the ramp mechanism 5, it becomes possible to reduce the number of components used in the storage apparatus 1, and increase the freedom of design of the inside of the storage apparatus 1. Further, it becomes possible to further improve the vibration resistance and the shock resistance of the storage apparatus 1, since the number of portions where the recording medium 2 is supported can be increased.

Figure 4:
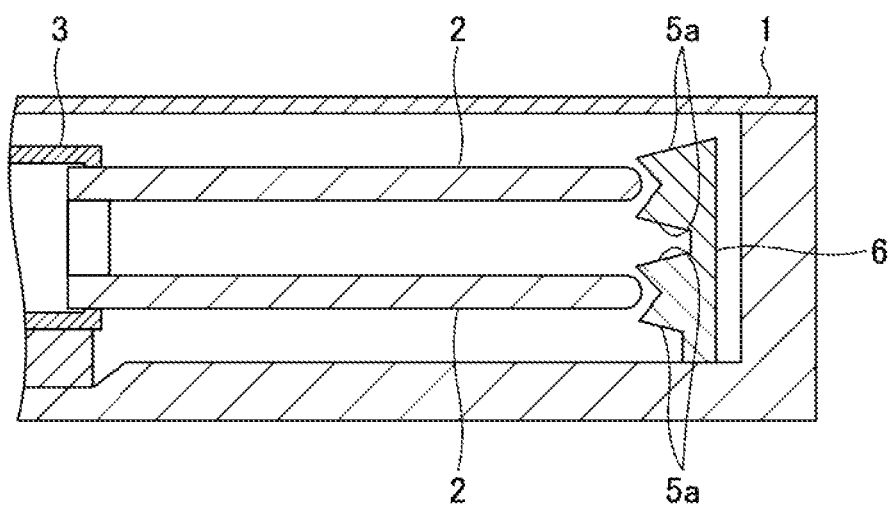
FIG. 4 is a schematic cross sectional view for explaining the storage apparatus according to the second embodiment of the present invention.

FIG. 4 is a schematic cross sectional view for explaining the storage apparatus according to the second embodiment of the present invention. FIG. 4 illustrates an example in which the support member 6 can also function as the ramp mechanism 5. A surface 5a provided on a portion of the support member 6 can function as the ramp mechanism 5.

In a ramp mechanism having a conventional structure, the recording medium bends when the strong external vibration or shock is applied to the storage apparatus, and the recording surface (that is, the surface from which the information is read and to which the information is written) of the recording medium and the ramp mechanism may make contact with each other, and cause damage to the recording surface.

But by employing the structure of the support member 6 illustrated in FIG. 4, the support member 6 supports an end portion or side surface of the recording medium 2 before the recording surface of the recording medium 2 and the ramp mechanism 5 make contact with each other, thereby preventing damage to the recording surface of the recording medium 2 that would otherwise occur if the recording surface and the ramp mechanism 5 were to make contact with each other. Hence, it is possible to further improve the vibration resistance and the shock resistance of the storage apparatus 1. Furthermore, it is possible to increase the degree of freedom of design of the inside of the storage apparatus 1, and reduce the number of components used in the storage apparatus 1.

In addition, in a case where the ramp mechanism 5 illustrated in FIG. 1 employs the structure that enables the ramp mechanism 5 to also function as the support member 6 illustrated in FIG. 4, it is possible to increase the degree of freedom of design of the inside of the storage apparatus 1, further improve the vibration resistance and the shock resistance of the storage apparatus 1, and reduce the number of components used in the storage apparatus 1, as described above.

The storage apparatus 1 may preferably include a flow straightening plate for straightening an air flow generated due to the rotation of the recording media 2. In addition, this flow straightening plate may preferably have a structure that enables this flow straightening plate to also function as the support member 6. In this case, it becomes possible to increase the freedom of design of the inside of the storage apparatus 1, and further improve the vibration resistance and the shock resistance of the storage apparatus 1, since the number of portions where the recording medium 2 is supported can be increased. Moreover, becomes possible to reduce the number of components used in the storage apparatus 1.

Figure 5:
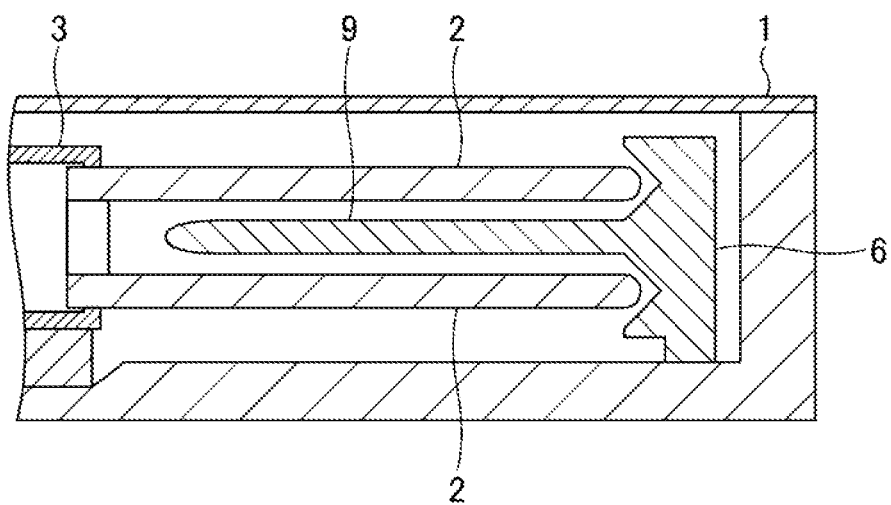
FIG. 5 is a schematic cross sectional view for explaining the storage apparatus according to a third embodiment of the present invention.

FIG. 5 is a schematic cross sectional view for explaining the storage apparatus according to a third embodiment of the present invention. FIG. 5 illustrates an example in which the support member 6 can also function as a flow straightening plate 9. The flow straightening plate 9 is a plate-shaped member arranged between adjacent recording media 2, for example, and is configured to straighten or suitably control the air flow generated due to the rotation of the recording media 2.

In the flow straightening plate having a conventional structure, the recording medium bends when the strong external vibration or shock is applied to the storage apparatus, and the recording surface (that is, the surface from which the information is read and to which the information is written) of the recording medium and the flow straightening plate may make contact with each other, and cause damage to the recording surface.

But by employing the structure of the support member 6 illustrated in FIG. 5, the support member 6 supports the end portion or the side surface of the recording medium 2 before the recording surface of the recording medium 2 and the flow straightening plate 9 make contact with each other, thereby preventing damage to the recording surface of the recording medium 2 that would otherwise occur if the recording surface and the flow straightening plate 9 were to make contact with each other. Hence, it is possible to further improve the vibration resistance and the shock resistance of the storage apparatus 1. Furthermore, it is possible to increase the degree of freedom of design of the inside of the storage apparatus 1, and reduce the number of components used in the storage apparatus 1.

The second embodiment and the third embodiment may be appropriately combined. In other words, the support member 6 may have a structure that enables the support member 6 to function as both the ramp mechanism 5 and the flow straightening plate 9, so that the effects of both the second and third embodiment can be obtained.

Accordingly, one of the support member 6, the ramp mechanism 5, and the flow straightening plate 9 may function as at least one of the remaining two of the support member 6, the ramp mechanism 5, and the flow straightening plate 9.

Of course, in each of the embodiments described above, the number of recording media 2 provided in the storage apparatus 1 is not limited to two, and a single recording medium 2 or three or more recording media 2 may be provided in the storage apparatus 1.

According to each of the embodiments described above, it is possible to provide a storage apparatus having a high resistance with respect to strong external vibration or shock that may be applied thereto.

Although the embodiments are numbered with, for example, "first," "second," or "third," the ordinal numbers do not imply priorities of the embodiments.

Further, the present invention is not limited to these embodiments and exemplary implementations, but various variations, modifications, and substitutions may be made without departing from the scope of the present invention.

What is claimed is:

1. A storage apparatus comprising:
a disk-shaped recording medium;
a casing accommodating the recording medium;
a motor configured to drive and rotate the recording medium;
a head configured to read information from and write information to the recording medium;
a stationary support member configured to support the recording medium by making contact with the recording medium only when the recording medium bends;
a ramp mechanism configured to move the head from a position above the recording medium to a head receded position not overlapping the recording medium in the plan view of the storage apparatus; and
a flow straightening plate configured to straighten an air flow generated due to rotation of the recording medium,
wherein the support member is attached to an inside wall of the casing, at an outer end portion of the recording medium and partially overlaps the recording medium in a plan view of the storage apparatus,
wherein the support member has a structure that enables the support member to function as both the ramp mechanism and the flow straightening plate, and
wherein the support member is provided at three or more locations inside the storage apparatus.

2. The storage apparatus as claimed in claim 1, wherein the support member is configured to make contact with the outer end portion of the recording medium.

3. The storage apparatus as claimed in claim 2, wherein the support member is provided at equally spaced locations with respect to the recording medium.

4. The storage apparatus as claimed in claim 1, wherein the support member is provided at equally spaced locations with respect to the recording medium.

5. A storage apparatus comprising:
a disk-shaped recording medium;
a casing accommodating the recording medium;
a motor configured to drive and rotate the recording medium;
a head configured to read information from and write information to the recording medium;
a stationary support member configured to support the recording medium by making contact with the recording medium only when the recording medium bends; and
a flow straightening plate configured to straighten an air flow generated due to rotation of the recording medium,
wherein the support member is attached to an inside wall of the casing, at an outer end portion of the recording medium and partially overlaps the recording medium in a plan view of the storage apparatus, and
wherein the flow straightening plate has a structure that enables the flow straightening plate to also function as the support member.

6. The storage apparatus as claimed in claim 5, wherein the support member is provided at equally spaced locations with respect to the recording medium.

7. The storage apparatus as claimed in claim 5, wherein the flow straightening plate is arranged between adjacent recording media.

8. The storage apparatus as claimed in claim 1, wherein the support member makes contact with the bent recording medium before other parts of the storage apparatus, so that no contact occurs between the bent recording medium and the other parts.

9. The storage apparatus as claimed in claim 1, wherein the recording medium bends in response to external vibration or shock applied to the storage apparatus.

10. The storage apparatus as claimed in claim 1, wherein the support member is configured to support the recording medium from above or from under the recording medium, by making contact with the outer end portion of the recording medium only when the external vibration or shock is applied to the storage apparatus.

11. A storage apparatus comprising:
a disk-shaped recording medium;
a casing accommodating the recording medium;
a motor configured to drive and rotate the recording medium;
a head configured to read information from and write information to the recording medium; and
a stationary support member configured to support the recording medium by making contact with the recording medium only when the recording medium bends,
wherein the support member is attached to an inside wall of the casing, at an outer end portion of the recording medium and partially overlaps the recording medium in a plan view of the storage apparatus,
wherein the support member is configured to support the recording medium from above or from under the recording medium, by making contact with the outer end portion of the recording medium only when the external vibration or shock is applied to the storage apparatus, and
wherein the support member includes
a first sloping surface, overhanging an upper surface of the recording medium from above the recording medium at the outer end portion of the recording medium, and
a second sloping surface, overhanging a lower surface of the recording medium from under the recording medium at the outer end portion of the recording medium,
wherein a distance from the first sloping surface to the upper surface of the recording medium increases toward a center of the recording medium, and
wherein a distance from the second sloping surface to the lower surface of the recording medium increases toward the center of the recording medium.

12. The storage apparatus as claimed in claim 11, wherein the outer end portion of the recording medium is rounded.

13. The storage apparatus as claimed in claim 2, wherein the outer end portion of the recording medium includes a surface portion of the recording medium where no reading of information and no writing of information take place.

14. The storage apparatus as claimed in claim 1, wherein a surface of the support member, making contact with the recording medium when the recording medium bends, is located on an inner side of the inside wall of the casing.

* * * * *